(12) United States Patent
Svihla

(10) Patent No.: US 11,879,348 B2
(45) Date of Patent: Jan. 23, 2024

(54) BEARING CARRIER

(71) Applicant: Progress Rail Locomotive Inc., LaGrange, IL (US)

(72) Inventor: Gary R. Svihla, Burr Ridge, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 68 days.

(21) Appl. No.: 17/524,456

(22) Filed: Nov. 11, 2021

(65) Prior Publication Data
US 2023/0145706 A1    May 11, 2023

(51) Int. Cl.
*F01D 25/16*    (2006.01)
*F16C 35/00*    (2006.01)

(52) U.S. Cl.
CPC ............ *F01D 25/162* (2013.01); *F16C 35/00* (2013.01); *F05D 2220/40* (2013.01); *F16C 2360/24* (2013.01)

(58) Field of Classification Search
CPC ...... F01D 25/16; F01D 25/162; F04D 29/041; F04D 29/0413; F04D 29/051; F04D 29/0513
See application file for complete search history.

(56) References Cited

U.S. PATENT DOCUMENTS

| 3,667,214 A | 6/1972 | Addie |
| 4,573,808 A * | 3/1986 | Katayama ............. F16C 37/002 384/114 |
| 4,721,441 A | 1/1988 | Miyashita et al. |
| 5,169,242 A * | 12/1992 | Blase ..................... F01D 25/164 384/114 |
| 6,032,466 A | 3/2000 | Woollenweber et al. |

(Continued)

FOREIGN PATENT DOCUMENTS

| CH | 712614 B1 | 11/2020 |
| CN | 205841303 U | 12/2016 |

(Continued)

OTHER PUBLICATIONS

Written Opinion and International Search Report for Int'l. Patent Appln. No. PCT/US2022/079612, dated Mar. 6, 2023 (15 pgs).

*Primary Examiner* — Woody A Lee, Jr.
*Assistant Examiner* — Cameron A Corday

(57) ABSTRACT

A bearing assembly installed within a turbocharger housing between a turbine wheel and a compressor impeller mounted for rotation together on a turbocharger shaft may include a journal bearing disposed on a corresponding portion of the turbocharger shaft, a thrust bearing having a thrust bearing surface, and a bearing carrier. The bearing carrier may include a carrier body, a carrier body bore extending axially through the carrier body and receiving the journal bearing therein, and a thrust bearing seat on the exterior of the carrier body facing the turbine wheel. The thrust bearing seat may have a complimentary shape to the thrust bearing surface of the thrust bearing, the thrust bearing disposed between the carrier body and the turbine wheel and engaging the thrust bearing seat. The bearing assembly may further include an anti-thrust bearing surface facing the compressor impeller, and an anti-thrust bearing mounted to the anti-thrust bearing surface.

20 Claims, 4 Drawing Sheets

(56) References Cited

U.S. PATENT DOCUMENTS

| | | |
|---|---|---|
| 6,364,634 B1 | 4/2002 | Svihla et al. |
| 6,368,077 B1 | 4/2002 | Meyerkord et al. |
| 6,499,884 B1 * | 12/2002 | Svihla .................. F16C 17/10 |
| | | 384/138 |
| 6,499,969 B1 | 12/2002 | Tombers et al. |
| 6,896,479 B2 | 5/2005 | Svihla et al. |
| 7,108,488 B2 * | 9/2006 | Larue .................. F16C 37/002 |
| | | 384/106 |
| 7,371,047 B2 | 5/2008 | Burmester et al. |
| 8,128,865 B2 | 3/2012 | Jahnz et al. |
| 8,820,072 B2 | 9/2014 | Figura et al. |
| 8,858,156 B2 | 10/2014 | Swenson et al. |
| 9,127,690 B2 | 9/2015 | Knaack |
| 9,181,855 B2 | 11/2015 | Svihla et al. |
| 9,200,567 B2 | 12/2015 | Parket et al. |
| 9,279,343 B2 | 3/2016 | Knaack |
| 9,470,240 B2 | 10/2016 | Uneura |
| 9,482,240 B2 | 11/2016 | Gerard et al. |
| 9,546,563 B2 | 6/2017 | Panambur et al. |
| 9,726,020 B2 | 8/2017 | Loewenberg |
| 9,835,164 B2 | 12/2017 | Svihla et al. |
| 9,874,099 B2 | 1/2018 | Rexavier et al. |
| 9,915,172 B2 | 3/2018 | Annati et al. |
| 10,018,205 B2 | 7/2018 | Pinkney et al. |
| 10,119,417 B2 | 11/2018 | Bucking |
| 10,161,265 B2 | 12/2018 | Isayama et al. |
| 10,436,211 B2 | 10/2019 | McArdle et al. |
| 10,677,099 B2 | 6/2020 | Hossbach |
| 2010/0143111 A1 | 6/2010 | Kuehnel |
| 2010/0215506 A1 | 8/2010 | Heyes et al. |
| 2014/0208741 A1 | 7/2014 | Svihla et al. |
| 2016/0097302 A1 | 4/2016 | Svihla et al. |
| 2016/0177960 A1 * | 6/2016 | Svihla .................. F04D 29/624 |
| | | 417/407 |
| 2016/0177965 A1 | 6/2016 | Svihla et al. |
| 2017/0002828 A1 | 1/2017 | Rexavier et al. |
| 2018/0328373 A1 | 11/2018 | Aynacioglu et al. |
| 2020/0182137 A1 | 6/2020 | Carr et al. |
| 2021/0156304 A1 | 5/2021 | Kobielski et al. |

FOREIGN PATENT DOCUMENTS

| | | |
|---|---|---|
| CN | 207728444 U | 8/2018 |
| DE | 102015216319 A1 | 3/2017 |
| EP | 2865897 B1 | 4/2016 |
| EP | 3708779 A1 | 9/2020 |
| JP | 3587350 B2 | 11/2004 |
| JP | 5598433 B2 | 10/2014 |

* cited by examiner

BEARING CARRIER

TECHNICAL FIELD

The present disclosure relates generally to turbochargers and, more particularly, to turbochargers with turbocharger housings configured for efficient assembly and effective bearing of thrust loads and other loading.

BACKGROUND

Internal combustion engines, for example, diesel engines, gasoline engines, or natural gas engines, employ turbochargers to deliver compressed air for combustion in the engine. A turbocharger compresses air flowing into the engine, helping to force more air into combustion chambers of the engine. The increased supply of air allows for increased fuel combustion in the combustion chambers of the engine, resulting in increased power output from the engine.

A typical turbocharger includes a shaft, a turbine wheel connected to one end of the shaft, a compressor impeller (sometimes referred to as a compressor wheel) connected to the other end of the shaft, and bearings to support the shaft. Separate housings connected to each other enclose the compressor impeller, the turbine wheel and the bearings. Exhaust from the engine expands over the turbine wheel and rotates the turbine wheel. The turbine wheel in turn rotates the compressor impeller via the shaft. The compressor impeller receives cool air from the ambient surroundings and forces compressed air into combustion chambers of the engine.

Turbocharger bearing systems for the turbocharger shaft, the compressor wheel and the compressor impeller require accurate alignment within surrounding housing components. In previously-known turbochargers, such as that disclosure in U.S. Pat. No. 9,279,343 to Knaack that issued on Mar. 8, 2016 ("the '343 patent"), separate housing and sub-housings are incorporated into turbocharger housings along turbine housing and compressor housings to support the bearings. Adding additional sub-housings to support the bearings creates the potential for added errors in alignment, but can improve the ability to remanufacture the turbocharger. Typically, a bearing carrier or sub-housing used to support the compressor side assemblage requires installation from the compressor side of the primary turbocharger housing. Operating temperatures remain lower than the equivalent turbine side housings, although oftentimes oil supply restrictions in particular require a rather large bearing carrier that remains difficult to machine and integrate into the primary housing.

SUMMARY OF THE DISCLOSURE

In one aspect of the present disclosure, a bearing carrier for a turbocharger installed within a turbocharger housing between a turbine wheel and a compressor impeller mounted for rotation together on a turbocharger shaft is disclosed. The bearing carrier may include a carrier body, a carrier body bore extending axially through the carrier body and receiving a journal bearing and a corresponding portion of the turbocharger shaft, and a thrust bearing seat on the exterior of the carrier body facing the turbine wheel. The thrust bearing seat may have a complimentary shape to a thrust bearing surface of a thrust bearing disposed between the carrier body and the turbine wheel and engaging the thrust bearing seat.

In another aspect of the present disclosure, a bearing assembly for a turbocharger installed within a turbocharger housing between a turbine wheel and a compressor impeller mounted for rotation together on a turbocharger shaft is disclosed. The bearing assembly may include a journal bearing disposed on a corresponding portion of the turbocharger shaft, a thrust bearing having a thrust bearing surface, and a bearing carrier. The bearing carrier may include a carrier body, a carrier body bore extending axially through the carrier body and receiving the journal bearing therein, and a thrust bearing seat on the exterior of the carrier body facing the turbine wheel. The thrust bearing seat may have a complimentary shape to the thrust bearing surface of the thrust bearing, the thrust bearing disposed between the carrier body and the turbine wheel and engaging the thrust bearing seat.

In a further aspect of the present disclosure, a turbocharger housing for a turbocharger that includes a turbine wheel and a compressor impeller mounted on a turbocharger shaft for rotation together is disclosed. The turbocharger housing may include a compressor bearing housing with a bearing mounting flange disposed between the turbine wheel and the compressor impeller, and a bearing carrier mounted on the bearing mounting flange. The bearing carrier may include a carrier body, a carrier body bore extending axially through the carrier body and receiving a journal bearing and a corresponding portion of the turbocharger shaft, and a thrust bearing seat on the exterior of the carrier body facing the turbine wheel. The thrust bearing seat may have a complimentary shape to a thrust bearing surface of a thrust bearing disposed between the carrier body and the turbine wheel and engaging the thrust bearing seat, wherein the bearing carrier engages the bearing mounting flange to transmit thrust loads on the turbine wheel in a direction of the compressor impeller to the compressor bearing housing.

Additional aspects are defined by the claims of this patent.

DETAILED DESCRIPTION

Figure 1:
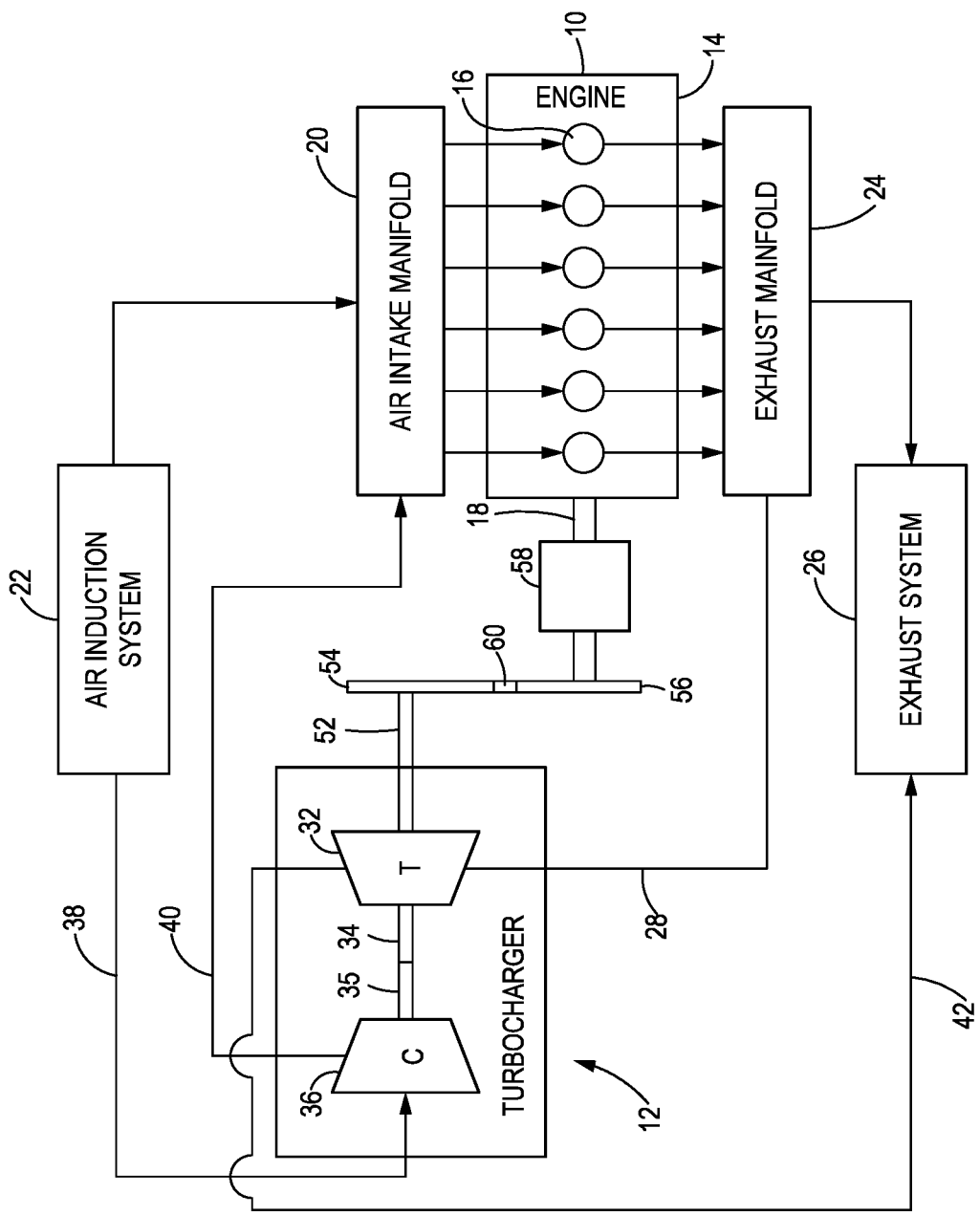
FIG. 1 is a schematic illustration of an exemplary internal combustion engine and a turbocharger in accordance with the present disclosure.

Referring to FIG. 1, an internal combustion engine 10 having an integrated turbocharger 12 in accordance with the present disclosure is illustrated schematically. The engine 10 may find applications in mobile machines (not shown) such as, but not limited to, vehicles, heavy mechanical equipment, large tractors, on-road vehicles, off-road vehicles, marine vessels and the like, and in stationary machines such as generator sets and pumps. The engine 10 may include a crankcase 14 that forms a plurality of compression cylinders 16. While six compression cylinders 16 are shown in an inline arrangement for illustration purposes, fewer or more compression cylinders 16 arranged in inline or alternative configurations within the crankcase 14, for example in a V-configuration, may be used. Each compression cylinder 16 may include a reciprocating piston (not shown) connected to a common engine output shaft 18. In the engine 10, the combustion of a fuel and air mixture in the compression cylinders 16 generates motive power that rotates the engine output shaft 18, and a resultant mixture of exhaust gas is produced as is known in the art.

The engine 10 may include an air intake manifold 20 that is selectively in fluid communication with each compression cylinder 16 and provides compressed intake air to the compression cylinders 16. Air may be provided to air intake manifold 20 by an air induction system 22 that draws air from the ambient atmosphere surrounding the engine 10 and the machine in which the engine 10 is implemented. The engine 10 may include a fuel tank (not shown) to store suitable fuel for combustion in the compression cylinders 16 of the engine 10. In various embodiments, the engine 10 may be configured to combust gasoline, diesel fuel, natural gas (liquefied or compressed) or other combustible energy sources, and the fuel tank will be configured as appropriate to store the fuel and provide the fuel to the engine 10 as required and known in the art. Compressed air from the air intake manifold 20 along with the fuel from the fuel tank provided to the compression cylinders 16 forms a combustible mixture that ignites when compressed or in the presence of a spark. Combustion byproducts are evacuated from each compression cylinder 16 through exhaust valves (not shown) to an exhaust manifold 24 that collects the exhaust gas from each compression cylinder 16, and at least a portion of the exhaust gases may be transmitted to an exhaust system 26 for after treatment prior to being released back into the atmosphere. In the engine 10, the intake air in the air intake manifold 20 as well as the exhaust gas released to the exhaust manifold 24 are under pressure.

In the illustrated embodiment, the turbocharger 12 is integrated with the engine 10 to provide compressed air with greater pressure to the air intake manifold 20. As schematically illustrated in FIG. 1, the turbocharger 12 may be fluidly connected to the exhaust manifold 24 and arranged to receive pressurized exhaust gas therefrom via a high pressure exhaust gas line 28. A turbocharger housing 30 of the turbocharger 12 is configured so that the pressurized exhaust gas from the high pressure exhaust gas line 28 acts on a turbine wheel 32 mounted on a turbocharger shaft 34 within the turbocharger housing 30. The turbocharger 12 may further include a compressor impeller 36 mounted via a compressor stud 35 (FIG. 3) that is coupled to the turbocharger shaft 34 for rotation with the turbocharger shaft 34 and the turbine wheel 32. The pressurized exhaust gas from the high pressure exhaust gas line 28 is directed at the turbine wheel 32 to create exhaust torque on the turbocharger shaft 34. When the exhaust gas temperature and pressure are sufficient, the exhaust torque causes the turbine wheel 32 to rotate the turbocharger shaft 34, the compressor stud 35 and the compressor impeller 36. A compressor stage 62 (FIGS. 2 and 3) of the turbocharger 12 in which the compressor impeller 36 is disposed may receive air from the air induction system 22 via a low pressure air line 38. The rotating compressor impeller 36 compresses the air from the air induction system 22 and outputs compressed air to the air intake manifold 20 via a high pressure air line 40 for addition to the air coming directly from the air induction system 22 and the fuel from the fuel tank. After powering the turbine wheel 32, the spent exhaust gas is discharged to the exhaust system 26 via a low pressure exhaust gas return line 42.

During some operating conditions of the engine 10, it may be desirable to drive the turbine wheel 32 of the turbocharger 12 even though the temperature and pressure of the exhaust gas in the high pressure exhaust gas line 28 are insufficient to rotate the turbine wheel 32 or to rotate the turbine wheel 32 at a desired speed. For example, at low engine speeds such as when the engine 10 is idling, emissions of pollutants such as nitrous oxides (NOx) can increase and low exhaust temperatures can make exhaust after treatment systems in the exhaust system 26 ineffective. In one exemplary embodiment, to selectively provide direct drive to the turbocharger 12 by the engine 10 when the operating conditions dictate, the engine output shaft 18 may drive the turbocharger shaft 34 when the exhaust gas will not drive the turbine wheel 32, and may be disengaged when the exhaust gas will create sufficient torque and rotate the turbine wheel 32 and the compressor impeller 36 at sufficient speeds so that direct drive by the engine 10 is unnecessary.

In an embodiment, a carrier shaft 52 may be operatively coupled to the turbine wheel 32 and may have a carrier drive gear 54 mounted thereon and rotatable therewith. An operative connection between the engine 10 and the carrier drive shaft may be provided by a turbocharger drive gear 56 connected to a gear train or transmission 58 that is driven by the engine output shaft 18. The turbocharger drive gear 56 is operatively connected to the carrier drive gear 54 by one or more idler gears 60 so that the carrier shaft 52 will spin at a desired speed and direction relative to the engine output shaft 18. In other embodiments that utilize a compressor housing 66 (FIGS. 2 and 3) disclosed herein, other appropriate drive mechanisms and arrangements may be utilized to drive the turbine wheel 32 and compressor impeller 36.

Figure 2:
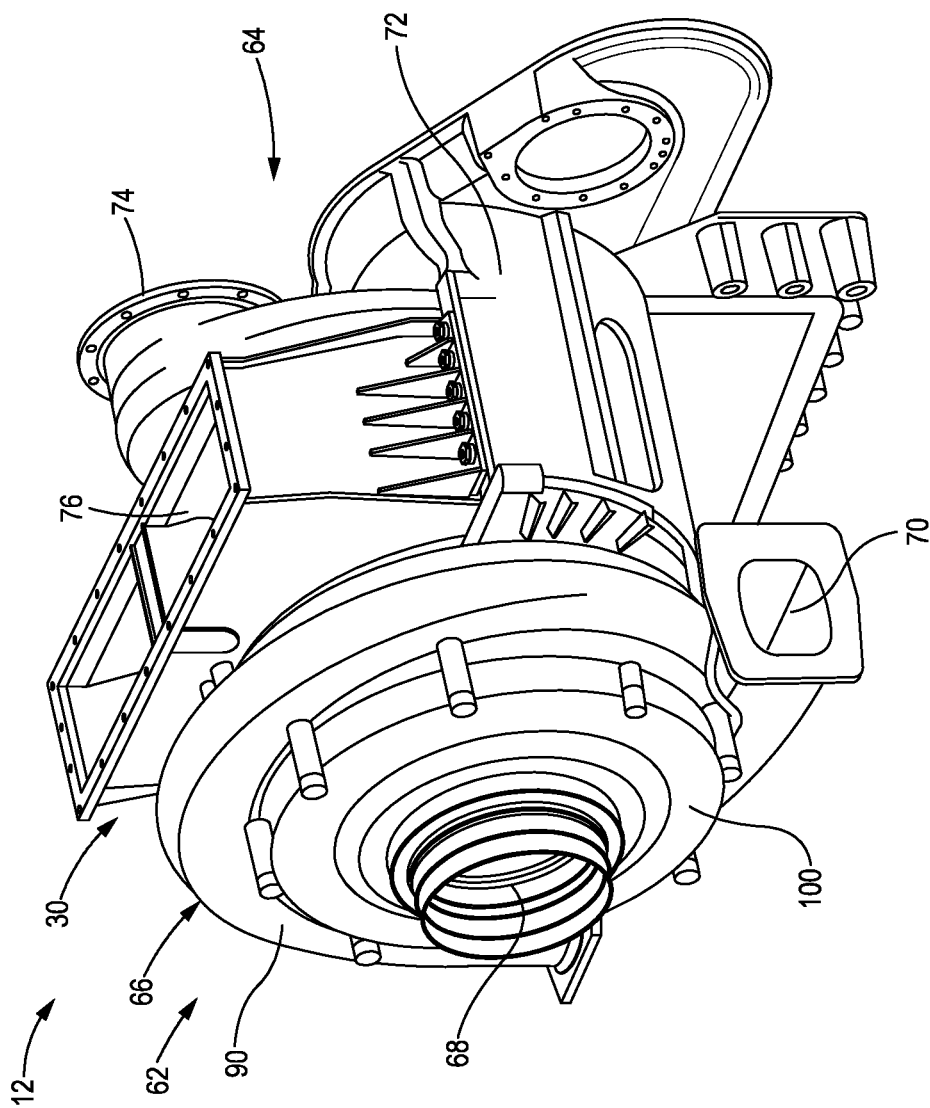
FIG. 2 is a perspective view of an exemplary configuration of the turbocharger of FIG. 1.
Figure 3:
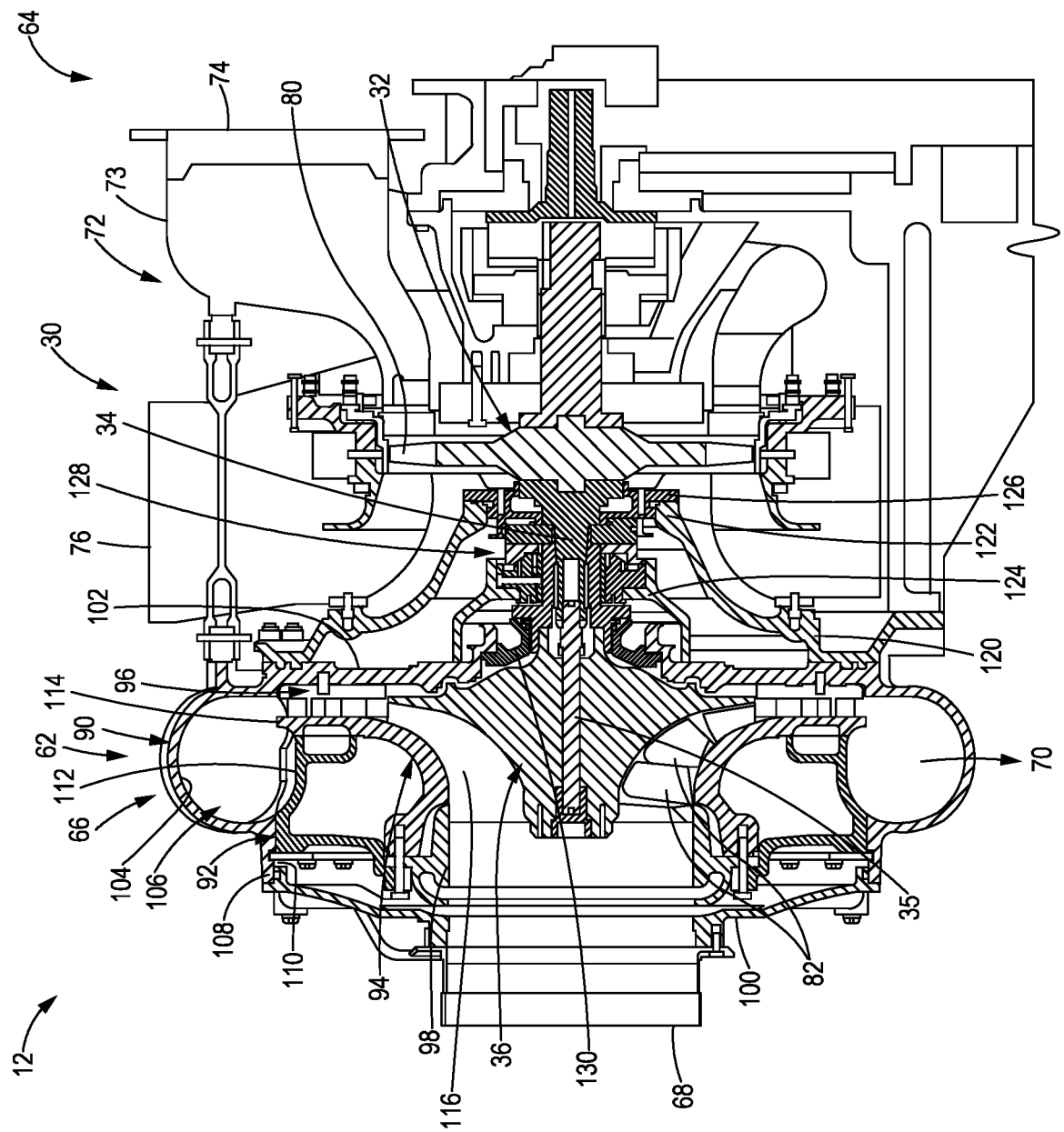
FIG. 3 is a cross-sectional view of an exemplary configuration of the turbocharger of FIG. 2.

FIGS. 2 and 3 illustrate an exemplary embodiment of a turbocharger 12 in accordance with the present disclosure that may be implemented with the engine 10 of FIG. 1. As shown in FIG. 3, the turbocharger 12 may include the compressor stage 62 and a turbine stage 64 disposed in the turbocharger housing 30 (FIGS. 2 and 3). The turbocharger housing 30 comprises the compressor housing 66 and a turbine housing 72. The compressor stage 62 may embody a fixed geometry compressor impeller 36 (FIG. 3) attached via the compressor stud 35, which is coupled to the turbocharger shaft 34, and configured to compress air received from the air induction system 22 (FIG. 1) before the air enters the engine 10 for combustion. Air may enter the compressor housing 66 via a compressor inlet 68 (FIG. 2) and exit the compressor housing 66 via a compressor outlet 70. As air moves through the compressor stage 62, the compressor impeller 36 may increase the pressure of the air that is directed into the engine 10.

Referring to FIG. 3, the turbine stage 64 may include a turbine housing 72 and the turbine wheel 32 that may be operably connected to the turbocharger shaft 34 (which may comprise one or more shafts operably coupled). Exhaust gases exiting the engine 10 may enter a turbine scroll 73 via a turbine inlet 74 and flow toward a turbine exhaust duct 76. The exhaust gases exit the turbine housing 72 via the turbine exhaust duct 76. As the hot exhaust gases move through the turbine housing 72 and expand against the blades 80 of the turbine wheel 32, the turbine wheel 32 may rotate the compressor impeller 36 via the operable connection of the turbocharger shaft 34 and the compressor stud 35. The hot exhaust gases may also heat the turbine housing 72, which in turn may heat the compressor housing 66 and other components of the turbocharger 12 attached to or located near the turbine housing 72. As the compressor impeller 36 is rotated by the turbine wheel 32, air may be drawn axially inward through the compressor inlet 68 toward a center of the compressor impeller 36. Compressor blades 82 of the compressor impeller 36 may then push the air radially outward in a spiraling fashion into the compressor outlet 70 and to the air intake manifold 20.

The compressor stage 62 as illustrated is formed by a series of components including the compressor housing 66 that encloses the compressor impeller 36 and defines the airflow channels fluidly connecting the compressor inlet 68 to the compressor outlet 70. The compressor housing 66 may include, among other elements, an outer volute 90, an inner volute 92, an impeller cover 94, a compressor diffuser 96, an insert 98 and a compressor cover 100. The outer volute 90 in the illustrated embodiment includes a back wall 102 that separates the compressor housing 66 from a compressor bearing housing 120, and has the turbocharger shaft 34 extending therethrough. A curved airflow passageway wall 104 may extend generally radially outward from the back wall 102 and wrap around to form a radially outer portion of an airflow passageway 106 that is fluidly connected to the compressor outlet 70. The outer volute 90 may further include an annular outer volute flange 108 with an outer volute inner surface 110 that receives the inner volute 92, the impeller cover 94, the compressor diffuser 96, and the insert 98 therethrough. The inner volute 92 may include a curved bridge wall 112 that combines with an outer end wall 114 of the impeller cover 94 to form a radially inner portion of the airflow passageway 106. The compressor diffuser 96 may be positioned adjacent to and abut the back wall 102 of the outer volute 90, and the outer end wall 114 of the impeller cover 94 may be disposed between the compressor diffuser 96 and the curved bridge wall 112 of the inner volute 92. The impeller cover 94 and the insert 98 may define a compressor cavity 116 around the compressor impeller 36 such that the compressor cavity 116, the compressor diffuser 96 and the airflow passageway 106 define a continuous fluid passage connecting the compressor inlet 68 to the compressor outlet 70.

The turbine housing 72 may be configured for efficient assembly and effective bearing of loads on the turbocharger shaft 34 and the compressor stud 35 that are created by the turbine wheel 32 and the compressor impeller 36. The turbine housing 72 may include the compressor bearing housing 120 mounted to the main turbocharger housing 30 on the turbine side of the back wall 102 of the outer volute 90. The compressor bearing housing 120 may be disposed between the turbine wheel 32 and the compressor impeller 36, and surround and support the corresponding portion of the turbocharger shaft 34 after the turbocharger 12 is assembled. The compressor bearing housing 120 may include a turbine seal mounting flange 122 extending toward and terminating proximate the turbine wheel 32, and a bearing mounting flange 124 extending toward the turbine wheel 32 and terminating at a location between the compressor impeller 36 and the turbine seal mounting flange 122. A turbine seal 126 is mounted to the turbine seal mounting flange 122, and a bearing assembly 128 is mounted to the bearing mounting flange 124. The portion of the turbocharger shaft 34 between the turbine wheel 32 and the compressor impeller 36 passes through the turbine seal 126, the bearing assembly 128 and a compressor seal 130 that is mounted to the back wall 102 of the outer volute 90.

Figure 4:
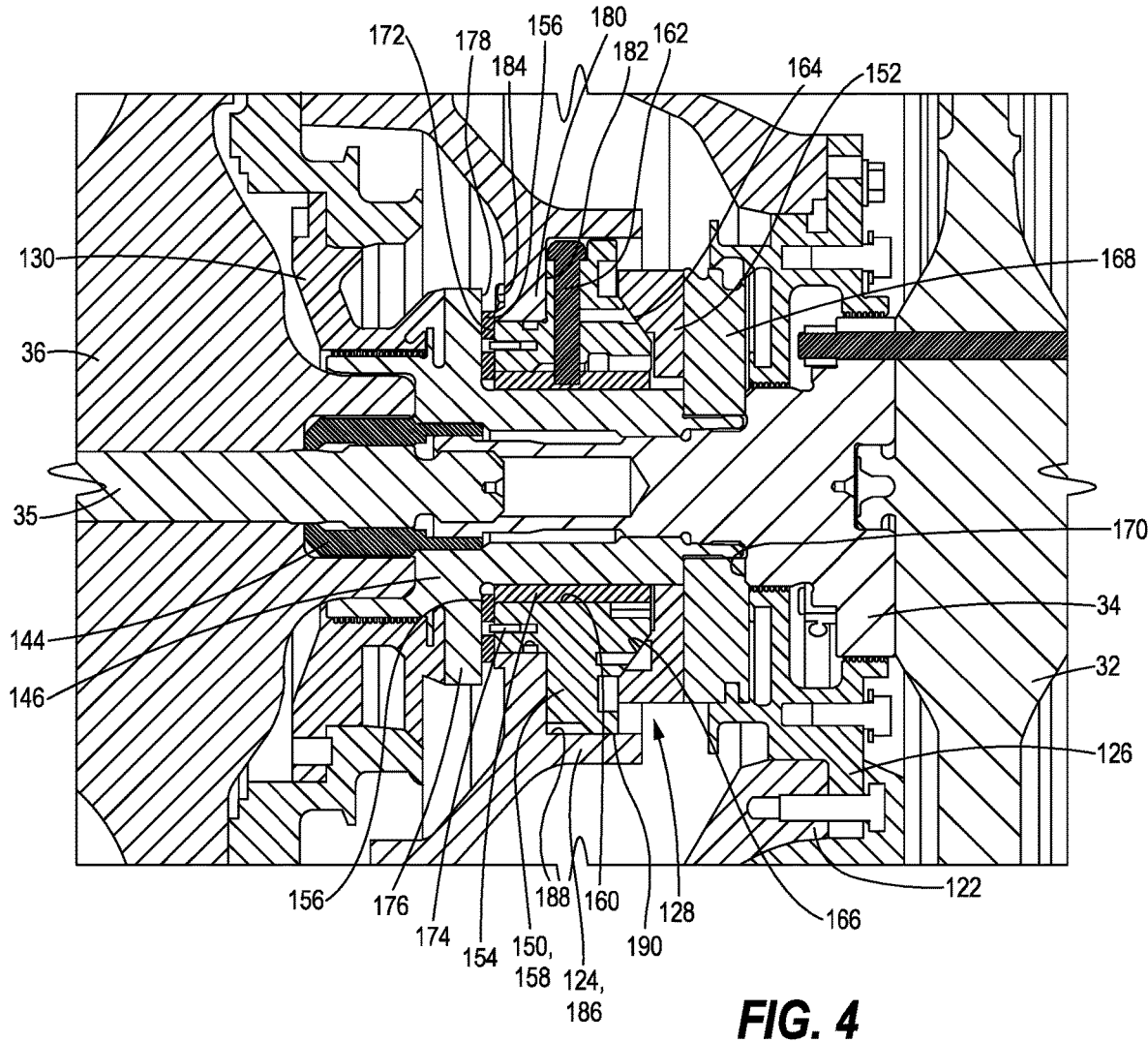
FIG. 4 is an enlarged cross-sectional view of a bearing assembly in accordance with the present disclosure and adjacent components of a turbocharger shaft of the turbocharger of FIG. 2.

The area between the turbine wheel 32 and the compressor impeller 36 is shown in greater detail in the enlarged cross-section of FIG. 4. In the illustrated embodiment, the turbocharger shaft 34 is assembled from multiple components to facilitate assembly of the turbocharger 12 and effective operation of the turbocharger 12 after assembly. The turbocharger shaft 34 extends toward the compressor impeller 36, and includes a bore that receives an end of the compressor stud 35. A shaft insert 144 surrounds the interface between the turbocharger shaft 34 and the compressor stud 35, and an impeller collar 146 encircles portions of the turbocharger shaft 34, the compressor stud 35 and the shaft insert 144, and the components are secured together so that the turbine wheel 32 and the compressor impeller 36 rotate together. The illustrated composition and arrangement of the components is exemplary, and alternative constructions that interact with the bearing assembly 128 as described hereinafter are contemplated by the inventor.

The bearing assembly 128 is configured to support the turbocharger shaft 34 and acts as an intermediary to transfer loads from the turbine wheel 32, the turbocharger shaft 34 and the compressor impeller 36 to the turbine housing 72 via the compressor bearing housing 120. The bearing assembly 128 is disposed around the turbocharger shaft 34 between the turbine wheel 32 and the compressor impeller 36. In particular, in the illustrated embodiment, the bearing assembly 128 is disposed on the impeller collar 146. The bearing assembly 128 includes a bearing carrier 150 configured to support a journal bearing 154, a thrust bearing 152 and one or more anti-thrust bearings 156. The bearing carrier 150 has a carrier body 158 with an annular shape and a carrier body bore 160 dimensioned to receive the journal bearing 154 therein. A floating anti-rotation pin 162 may be inserted in a radial anti-rotation pin bore and into engagement with the journal bearing 154 to prevent axial translation and circumferential rotation of the journal bearing 154 relative to the bearing carrier 150. The journal bearing 154 is dimensioned to receive the impeller collar 146 during assembly for support of the turbocharger shaft 34.

A thrust bearing seat 164 of the bearing carrier 150 is oriented facing the turbine wheel 32 when installed as shown. The thrust bearing 152 has a thrust bearing surface 166 with a complimentary shape to the thrust bearing seat 164 to substantially limit radial movement of the thrust bearing 152 relative to the bearing carrier 150. The thrust bearing 152 is positioned against the thrust bearing seat 164 by a thrust washer 168 that is disposed between the thrust bearing 152 and the turbine seal 126 and a thrust shoulder 170 of the turbocharger shaft 34. In the illustrated embodiment, the conical or spherical thrust bearing seat 164 and thrust bearing surface 166 limit pure radial movement of the thrust bearing 152 while allowing for angular variations experienced by the rotary components. In alternative embodiments, the thrust bearing seat 164 and the thrust bearing surface 166 may have other complimentary shapes and connectivity at their interface that facilitate load transfer and constrain or control movement of the thrust bearing 152 relative to the bearing carrier 150. For example, the thrust bearing seat 164 and the thrust bearing surface 166 may be planar and use a pilot or dual pin alignment to prevent radial movement while allowing a degree of relative angular movement. Additional complimentary shapes are contemplated by the inventor that facilitate compact designs of the bearing carrier 150 and support of the bearings 152, 154, 156 for installation from the turbine side and ensure direct load paths to the structural components of the turbocharger housing 30.

On the opposite side of the bearing carrier 150 from the thrust bearing seat 164, an anti-thrust bearing surface 172 faces the compressor impeller 36. The anti-thrust bearing surface 172 may have one or more anti-thrust bearings 156 mounted thereto by anti-thrust mounting bolts 174 or other appropriate attachment mechanisms. A collar flange 176 extends radially outward from the impeller collar 146 and is disposed between the compressor seal 130 and the bearing carrier 150. The collar flange 176 includes an anti-thrust shoulder 178 that faces the anti-thrust bearings 156 after installation as shown. Those skilled in the art will understand that the anti-thrust bearings 156 may be omitted in some turbocharger implementations with low anti-thrust loads. In such implementations, the anti-thrust shoulder 178 may face and engage the anti-thrust bearing surface 172 to during anti-thrust loading.

The bearing carrier 150 is mounted to the bearing mounting flange 124 to support the bearing carrier 150 in the axial and the radial directions. The bearing mounting flange 124 may include an axial support ring 180 having an annular shape and extending radially inward toward the turbocharger shaft 34. The bearing carrier 150 is disposed on the turbine side of the axial support ring 180 and has an axial support surface 182 that faces and engages the axial support ring 180. A carrier mounting bolt 184 or bolts or other appropriate attachment mechanisms threaded through the axial support ring 180 and into the bearing carrier 150 to secure the bearing carrier 150 to the axial support ring 180. The bearing mounting flange 124 further includes a carrier housing 186 having a hollow cylindrical shape and extending axially in the direction of the turbine wheel 32. The carrier housing 186 has a carrier housing inner surface 188 that receives the bearing carrier 150 and faces and engages a bearing carrier outer surface 190. The carrier housing inner surface 188 and the bearing carrier outer surface 190 are dimensioned so that the bearing carrier 150 may be press fit into the carrier housing 186 to substantially prevent movement of the bearing carrier 150 relative to the bearing mounting flange 124.

INDUSTRIAL APPLICABILITY

The bearing assembly 128 in accordance with the present disclosure allows installation on the turbine side of the turbocharger housing 30 with accurate alignment of the bearings 152, 154, 156 with the turbocharger shaft 34 and other components. The bearing carrier 150 performs the fixity and centering functions for all three of the shaft-related bearings 152, 154, 156. At the same time, the bearing carrier 150 effectively transmits loads to the structure of the turbine housing 72 with minimal load transfer to the bolts 184 in the bearing assembly 128. For example, radial loads on the turbocharger shaft 34 are transmitted through the journal bearing 154 and the bearing carrier 150 into the carrier housing 186 of the bearing mounting flange 124. Engagement between the surfaces 188, 190 results in minimal shear loading on the carrier mounting bolt(s) 184 when the radial loads are experienced.

The main thrust loads occur on the turbine wheel 32 in the direction toward the compressor impeller 36. The main thrust loads cause the thrust shoulder 170 to force the thrust washer 168 and the thrust bearing 152 against the bearing carrier 150, which in turn transmits the main thrust load to the axial support ring 180 of the bearing mounting flange 124. The carrier mounting bolt(s) 184 are completely unloaded due to the primary thrust load feeding directly through the bearing carrier 150 to the bearing mounting flange 124 so that this arrangement essentially eliminates significant tensile loads experienced by thrust bearing mounting bolts in previously-known turbocharges with thrust bearings installed from the compressor side of the turbocharger housing. Anti-thrust loads experienced by the compressor impeller 36 in the direction of the turbine wheel 32 are significantly lower than the main thrust loads. When anti-thrust loads occur, the anti-thrust shoulder 178 of the impeller collar 146 presses against the anti-thrust bearings 156. However, because the anti-thrust loads are smaller than the main thrust loads, the press fit engagement between the surfaces 188, 190 may be sufficient to withstand the anti-thrust loads without dislodging the bearing carrier 150 from the housing carrier 186, and the carrier mounting bolt(s) 184 are not required to absorb anti-thrust loads as was the design in previous turbochargers.

Installation of the single bearing carrier 150 that simultaneously supports the journal bearing 154, the primary thrust bearing 152 and the anti-thrust bearings 156 from the turbine housing 72 in the turbine stage 64 of the main turbocharger housing 30 allows a more compact and cost-effective design with no detriment to the turbine seal 126 installed near the turbine wheel 32. Bearing carriers in previously-known turbochargers require mounting flanges that are usually too large in diameter to fit through the mount for the turbine seal 126. Incorporating the three bearings along with integral anti-rotation features of the bearing carrier 150 reduces the overall envelope to not much larger in diameter than the largest bearing element, which in the present design is the thrust bearing 152. By placing the bearing mounting flange 124 on the turbine side, the main thrust loads from the turbine wheel 32 in the direction of the compressor impeller 36 react directly into the turbocharger housing 30 rather than creating tension in the carrier mounting bolt(s) 184 and the oil supply feeds to the three bearings 152, 154, 156 than in previous turbochargers where the bearings are mounted on the compressor side of the main housing. Once the anti-thrust mounting bolts 174 secure the anti-thrust bearings 156 from the compressor side that provides superior access due to the much smaller diameter of the anti-thrust bearings 156, the anti-thrust bearings 156 hold the bolt 174 captive and secure from rotating components once attached. The bearings 152, 154, 156 typically require replacement after years of service through normal wear or degraded performance due to foreign object damage to either the turbine wheel 32 or the compressor impeller 36. The complete bearing assembly 128 protects the turbine housing 72 from damage if a rotor failure damages the bearings 152, 154, 156, thereby facilitating remanufacture of the turbocharger 12.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A bearing carrier for a turbocharger installed within a turbocharger housing between a turbine wheel and a compressor impeller mounted for rotation together on a turbocharger shaft, wherein the turbocharger housing includes a compressor bearing housing between the turbine wheel and the compressor impeller and having a bearing mounting flange, the bearing carrier comprising:
   a carrier body mounted to the bearing mounting flange of the compressor bearing housing to support the bearing carrier in the axial direction and the radial direction;
   a carrier body bore extending axially through the carrier body and receiving a journal bearing and a corresponding portion of the turbocharger shaft; and
   a thrust bearing seat on the exterior of the carrier body facing the turbine wheel, wherein the thrust bearing seat has a complimentary shape to a thrust bearing surface of a thrust bearing disposed between the carrier body and the turbine wheel and engaging the thrust bearing seat.

2. The bearing carrier of claim 1, comprising an anti-thrust bearing surface facing the compressor impeller and having an anti-thrust bearing mounted thereto.

3. The bearing carrier of claim 1, wherein the bearing mounting flange has an axial support ring with an annular shape and extending radially inward toward the turbocharger shaft, and wherein the bearing carrier comprises an axial support surface facing the compressor impeller and facing and engaging the axial support ring to transmit thrust loads on the turbine wheel in a direction of the compressor impeller to the compressor bearing housing.

4. The bearing carrier of claim 3, comprising a carrier mounting bolt bore extending through the carrier body and receiving a carrier mounting bolt to mount the carrier body to the axial support ring.

5. The bearing carrier of claim 1, comprising an anti-rotation pin bore extending through the carrier body and receiving an anti-rotation pin to secure the journal bearing within the carrier body bore and prevent axial translation and circumferential rotation of the journal bearing relative to the carrier body.

6. The bearing carrier of claim 1, wherein the bearing mounting flange having has a carrier housing with a hollow cylindrical shape and extending axially toward the turbine wheel, and wherein the bearing carrier is received within and engages the carrier housing to transmit thrust loads on the turbine wheel in a direction of the compressor impeller to the compressor bearing housing.

7. The bearing carrier of claim 6, wherein the carrier housing has a carrier housing inner surface facing radially inward, the carrier body has a bearing carrier outer surface facing radially outward, and the carrier housing inner surface and the bearing carrier outer surface are facing and engaging to prevent radial movement of the bearing carrier relative to the compressor bearing housing.

8. A bearing assembly for a turbocharger installed within a turbocharger housing between a turbine wheel and a compressor impeller mounted for rotation together on a turbocharger shaft, wherein the turbocharger housing includes a compressor bearing housing between the turbine wheel and the compressor impeller and having a bearing mounting flange, the bearing assembly comprising:
   a journal bearing disposed on a corresponding portion of the turbocharger shaft;
   a thrust bearing having a thrust bearing surface; and
   a bearing carrier comprising:
      a carrier body mounted to the bearing mounting flange of the compressor bearing housing to support the bearing carrier in the axial direction and the radial direction,
      a carrier body bore extending axially through the carrier body and receiving the journal bearing therein, and
      a thrust bearing seat on the exterior of the carrier body facing the turbine wheel, wherein the thrust bearing seat has a complimentary shape to the thrust bearing surface of the thrust bearing, the thrust bearing disposed between the carrier body and the turbine wheel and engaging the thrust bearing seat.

9. The bearing assembly of claim 8, wherein the bearing carrier comprises an anti-thrust bearing surface facing the compressor impeller, and wherein the bearing assembly comprises an anti-thrust bearing mounted to the anti-thrust bearing surface.

10. The bearing assembly of claim 8, the bearing mounting flange having an axial support ring with an annular shape and extending radially inward toward the turbocharger shaft, and wherein the bearing carrier comprises an axial support surface facing the compressor impeller and facing and engaging the axial support ring to transmit thrust loads on the turbine wheel in a direction of the compressor impeller to the compressor bearing housing.

11. The bearing assembly of claim 10, wherein the bearing carrier comprises a carrier mounting bolt bore extending through the carrier body, and the bearing assembly comprise a carrier mounting bolt received through the carrier mounting bolt bore to mount the carrier body to the axial support ring.

12. The bearing assembly of claim 8, the bearing carrier comprising an anti-rotation pin bore extending through the carrier body, and the bearing assembly comprising an anti-rotation pin received in the anti-rotation pin bore to secure the journal bearing within the carrier body bore and prevent axial translation and circumferential rotation of the journal bearing relative to the carrier body.

13. The bearing assembly of claim 8, the bearing mounting flange having carrier housing with a hollow cylindrical shape and extending axially toward the turbine wheel, and wherein the bearing carrier is received within and engages the carrier housing to transmit thrust loads on the turbine wheel in a direction of the compressor impeller to the compressor bearing housing.

14. The bearing assembly of claim 13, wherein the carrier housing has a carrier housing inner surface facing radially inward, the carrier body has a bearing carrier outer surface facing radially outward, and the carrier housing inner surface and the bearing carrier outer surface are facing and engaging to prevent radial movement of the bearing carrier relative to the compressor bearing housing.

15. A turbocharger housing for a turbocharger that includes a turbine wheel and a compressor impeller mounted on a turbocharger shaft for rotation together, the turbocharger housing comprising:
   a compressor bearing housing with a bearing mounting flange disposed between the turbine wheel and the compressor impeller; and
   a bearing carrier mounted on the bearing mounting flange, the bearing carrier comprising:
      a carrier body mounted to the bearing mounting flange of the compressor bearing housing to support the bearing carrier in the axial direction and the radial direction,
      a carrier body bore extending axially through the carrier body and receiving a journal bearing and a corresponding portion of the turbocharger shaft, and
      a thrust bearing seat on the exterior of the carrier body facing the turbine wheel, wherein the thrust bearing seat has a complimentary shape to a thrust bearing surface of a thrust bearing disposed between the carrier body and the turbine wheel and engaging the thrust bearing seat, wherein the bearing carrier engages the bearing mounting flange to transmit thrust loads on the turbine wheel in a direction of the compressor impeller to the compressor bearing housing.

16. The turbocharger housing of claim 15, wherein the bearing carrier comprises an anti-thrust bearing surface facing the compressor impeller and having an anti-thrust bearing mounted thereto.

17. The turbocharger housing of claim 15, wherein the bearing mounting flange has an axial support ring with an annular shape and extending radially inward toward the turbocharger shaft, and wherein the bearing carrier comprises an axial support surface facing the compressor impeller and facing and engaging the axial support ring to transmit the thrust loads on the turbine wheel to the compressor bearing housing.

18. The turbocharger housing of claim 15, wherein the turbocharger housing includes a turbine seal mounting flange disposed between the turbine wheel and the bearing mounting flange and having a turbine seal mounted thereon, wherein the bearing carrier is installed in the turbocharger housing by inserting the bearing carrier through the turbine seal mounting flange and into engagement with the bearing mounting flange.

19. The turbocharger housing of claim 15, wherein the bearing mounting flange has a carrier housing with a hollow cylindrical shape and extending axially toward the turbine wheel, and wherein the bearing carrier is received within and engages the carrier housing to transmit the thrust loads on the turbine wheel to the compressor bearing housing.

20. The turbocharger housing of claim 19, wherein the carrier housing has a carrier housing inner surface facing radially inward, the carrier body has a bearing carrier outer surface facing radially outward, and the carrier housing inner surface and the bearing carrier outer surface are facing and engaging to prevent radial movement of the bearing carrier relative to the compressor bearing housing.

* * * * *